United States Patent
Chandra et al.

(10) Patent No.: US 11,040,628 B2
(45) Date of Patent: Jun. 22, 2021

(54) METHOD AND SYSTEM FOR CONTROLLING DISCHARGE RATIO BETWEEN PRIMARY AND SECONDARY BATTERY IN A VEHICLE

(71) Applicant: Hitachi, Ltd., Tokyo (JP)

(72) Inventors: Rishi Chandra, Bangalore (IN); Shin Yamauchi, Bangalore (IN)

(73) Assignee: HITACHI, LTD., Tokyo (JP)

( * ) Notice: Subject to any disclaimer, the term of this patent is extended or adjusted under 35 U.S.C. 154(b) by 268 days.

(21) Appl. No.: 16/240,909

(22) Filed: Jan. 7, 2019

(65) Prior Publication Data

US 2019/0241080 A1 Aug. 8, 2019

(30) Foreign Application Priority Data

Feb. 5, 2018 (IN) .............................. 201841004325

(51) Int. Cl.
*B60L 50/60* (2019.01)
*H01M 10/44* (2006.01)
(Continued)

(52) U.S. Cl.
CPC ............... *B60L 50/66* (2019.02); *B60L 58/13* (2019.02); *H01M 10/425* (2013.01);
(Continued)

(58) Field of Classification Search
CPC ...... H02J 7/0016; H02J 7/0025; H02J 7/0026; H02J 7/00306; H02J 2007/0067;
(Continued)

(56) References Cited

U.S. PATENT DOCUMENTS 9,263,909 B2   2/2016 Obata et al.
2010/0096918 A1*   4/2010 Sawada ............... B60L 7/14
                                                             307/9.1
(Continued)

FOREIGN PATENT DOCUMENTS

CN   102403767 A   4/2012
JP   2011-24322 A   2/2011
(Continued)

OTHER PUBLICATIONS

Translation of Japanese Office Action received in corresponding Japanese Application No. 2019-001780 dated Dec. 3, 2019.
Indian Patent Examination Report for corresponding IN Application No. 201841004325 dated Sep. 23, 2019.

*Primary Examiner* — Richard Isla
*Assistant Examiner* — Mohammed J Sharief
(74) *Attorney, Agent, or Firm* — Mattingly & Malur, PC

(57) ABSTRACT

Embodiments of present disclosure discloses method and system for controlling discharge ratio between a primary battery and a secondary battery in a vehicle. Initially, for the controlling, one or more sensor parameters of the vehicle comprising a primary battery and a secondary battery are retrieved. The power parameter required by the vehicle is estimated based on the one or more sensor parameters. A discharge ratio between the primary battery and the secondary battery is identified based on the power parameter and a function of power parameter to control the discharge ratio between the primary battery and the secondary battery in the vehicle. The function of power parameter is associated with input of plurality of power parameters relating to the vehicle and output of corresponding discharge ratio.

14 Claims, 10 Drawing Sheets

(51) Int. Cl.
    *H01M 10/42*     (2006.01)
    *B60L 58/13*     (2019.01)
    *H01M 16/00*     (2006.01)
    *H01M 10/48*     (2006.01)

(52) U.S. Cl.
CPC ....... *H01M 10/441* (2013.01); *H01M 10/482* (2013.01); *H01M 16/00* (2013.01); *H01M 2010/4271* (2013.01); *H01M 2010/4278* (2013.01); *H01M 2220/20* (2013.01)

(58) Field of Classification Search
CPC ....... H02J 7/0069; H02J 7/0078; B60L 50/66; B60L 58/13; H01M 10/425; H01M 10/441; H01M 10/482; H01M 16/00; H01M 2010/4271; H01M 2010/4278; H01M 2220/20
USPC ...................................... 320/118; 307/9.1, 24
See application file for complete search history.

(56) References Cited

U.S. PATENT DOCUMENTS

| | | | |
|---|---|---|---|
| 2011/0066311 A1* | 3/2011 | Itagaki | B60L 50/10 701/22 |
| 2012/0109442 A1* | 5/2012 | Kato | B60L 50/16 701/22 |
| 2015/0333550 A1* | 11/2015 | Takeda | G01R 31/382 320/134 |
| 2017/0008415 A1* | 1/2017 | Ando | B60L 50/13 |
| 2017/0155351 A1 | 6/2017 | Oguma et al. | |

FOREIGN PATENT DOCUMENTS

| | | |
|---|---|---|
| JP | 2014-230448 A | 12/2014 |
| JP | 5772965 B2 | 9/2015 |
| JP | 2017-99244 A | 6/2017 |

* cited by examiner

METHOD AND SYSTEM FOR CONTROLLING DISCHARGE RATIO BETWEEN PRIMARY AND SECONDARY BATTERY IN A VEHICLE

TECHNICAL FIELD

The present subject matter is related in general to automobile technology, more particularly, but not exclusively to a system and method for intelligently controlling discharge ratio between primary battery and secondary battery in a vehicle.

BACKGROUND

Vehicles such as electric vehicles or hybrid vehicles run on power from a battery. Such vehicles may be costly and life span may be short. It may be needed that life of the battery be enhanced to increase the life span of the vehicles. For efficient usage of battery, one or more conventional techniques disclose to divide the battery in such vehicles into a primary battery and a secondary battery. The secondary battery is connected in parallel to the primary battery and power required by the vehicle may be contributed by both the primary battery and the secondary battery. However, in conventional techniques, the secondary battery may be configured to contribute at both high current demand and low current demand in the vehicle. Thus, the secondary battery may drain out early and may not be able to contribute enough when there is high current demand.

Some conventional techniques disclose to determine current distribution ratio for efficient usage of both the primary battery and the secondary battery. The current distribution ratio may be based on one or more attributes, including, battery capacity of the primary battery and the secondary battery, temperature associated with the vehicle and so on. However, such conventional techniques may not distinguish between the low current demand and the high current demand. Hence, the secondary battery may be contributing at the low current demand as well, leading in faster draining of the secondary battery. By which, the primary battery may be left unprotected upon complete draining of the secondary battery. This may cause damage of the primary battery and may reduce life cycle of the primary battery.

Other conventional techniques disclose to maintain state of charge or depth of discharge of the primary battery and the secondary battery, at a predefined amount of percentage, for prolonging service life of the primary battery and the secondary battery. However, there may be at least minimal contribution of the secondary battery at the low current demand of the vehicle in such conventional techniques. Further, the conventional techniques employed in determining the percentage during operation of the vehicle may be complex and may consume lot of time.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for controlling discharge ratio between a primary battery and a secondary battery in a vehicle. Initially, for the controlling, one or more sensor parameters of the vehicle comprising a primary battery and a secondary battery are retrieved. The power parameter required by the vehicle is estimated based on the one or more sensor parameters. A discharge ratio between the primary battery and the secondary battery is identified based on the power parameter and a function of power parameter to control the discharge ratio between the primary battery and the secondary battery in the vehicle. The function of power parameter is associated with input of plurality of power parameters relating to the vehicle and output of corresponding discharge ratio.

In an embodiment, the present disclosure relates to a control system for controlling discharge ratio between a primary battery and a secondary battery in a vehicle. The control system comprises a processor and a memory communicatively coupled to the processor. The memory stores processor-executable instructions, which, on execution, cause the processor to control the discharge ratio. For controlling the discharge, initially, one or more sensor parameters of the vehicle comprising a primary battery and a secondary battery are retrieved. The power parameter required by the vehicle is estimated based on the one or more sensor parameters. A discharge ratio between the primary battery and the secondary battery is identified based on the power parameter and a function of power parameter to control the discharge ratio between the primary battery and the secondary battery in the vehicle. The function of power parameter is associated with input of plurality of power parameters relating to the vehicle and output of corresponding discharge ratio.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1A:
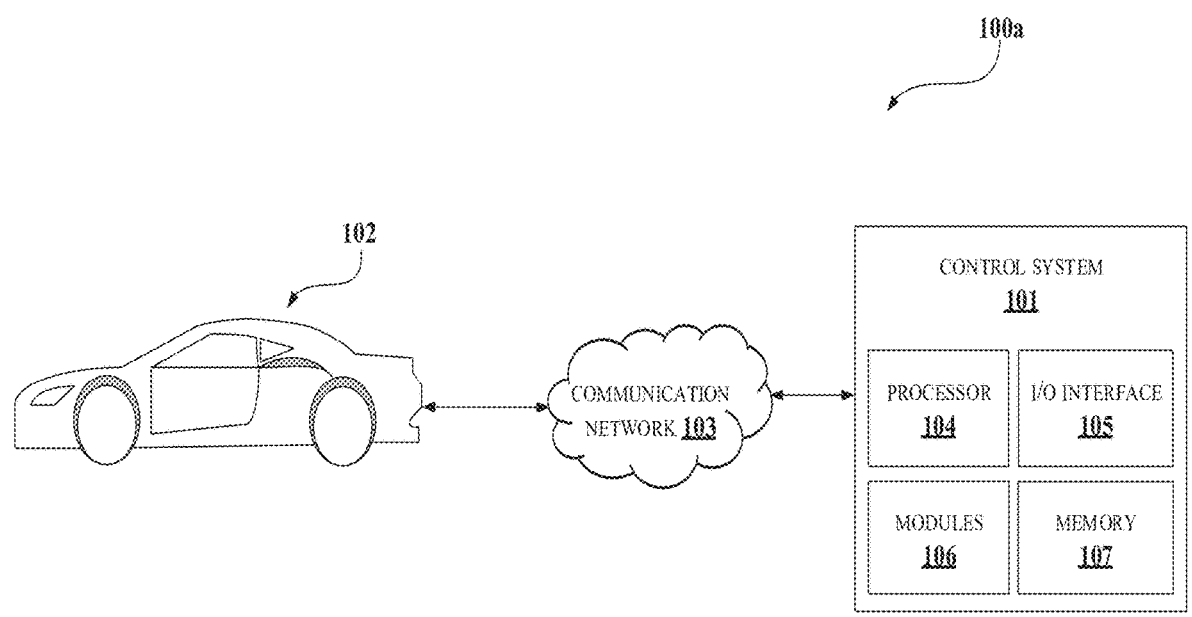
FIGS. 1a and 1b illustrate exemplary environments for controlling discharge ratio between a primary battery and a secondary battery in a vehicle in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Vehicle which runs on battery may comprise a primary battery. To improve life span of the primary battery, a secondary battery may be connected in parallel to the primary battery. Power required by the vehicle may be contributed by both the primary battery and the secondary battery. Present disclosure discloses a method and system to control discharge ratio of the power between the primary battery and the secondary battery. The present disclosure aims in reducing contribution of the secondary battery at low current demand, and maximize the contribution of the secondary battery at high current demand. Also, the present disclosure provisions to maintain optimal value of maximum current to be discharged by the primary battery at the high current demand. A function of a power parameter is proposed in the present disclosure for dynamically controlling the discharge ratio. The function of power parameter comprises a power parameter as input and the discharge ratio as the output. The power parameter may be estimated based on one or more sensor parameters associated with the vehicle.

Figure 1B:
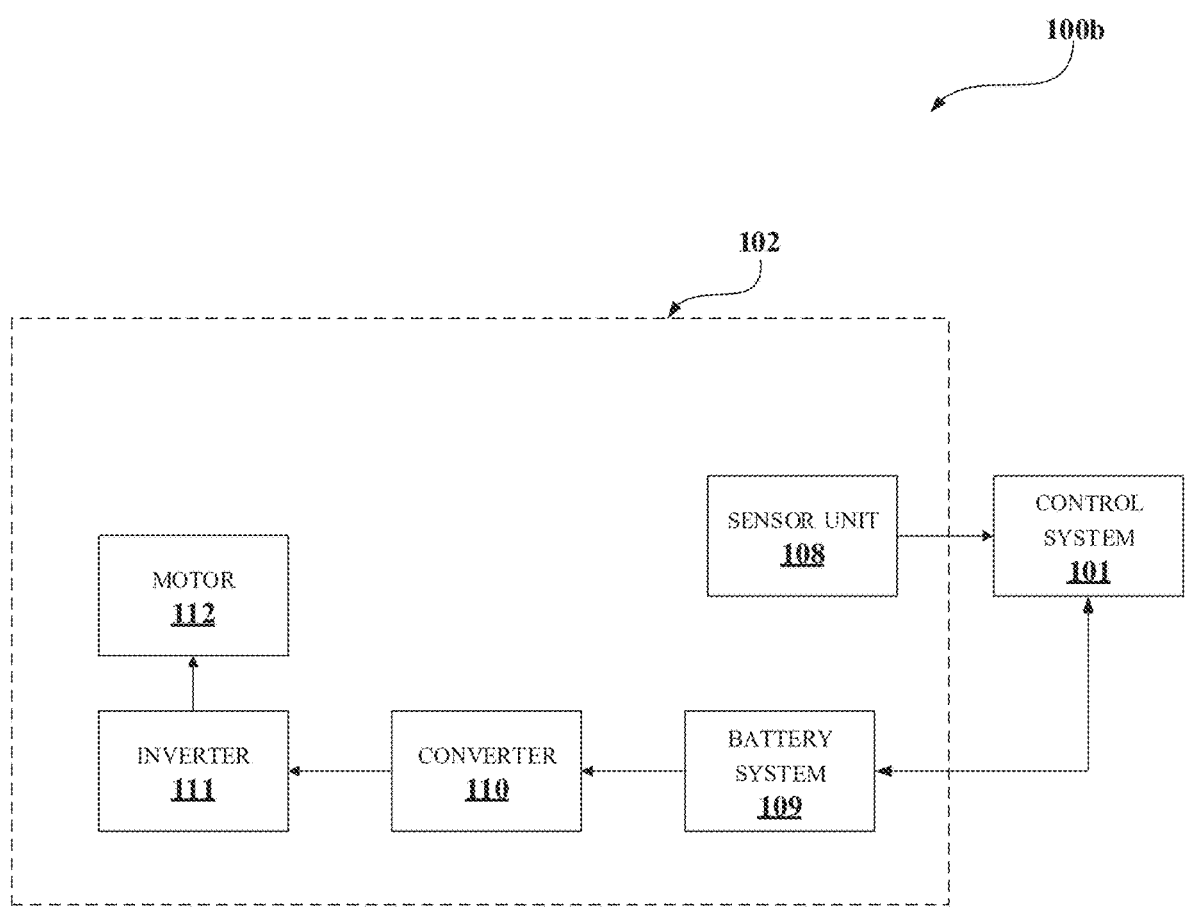

FIGS. 1a and 1b illustrate exemplary environments 100a and 1001b of a control system 101 for controlling discharge between primary battery and secondary battery of a vehicle 102. The exemplary environment 100a comprises the control system 101, the vehicle 102 and a communication network 103, to control the discharge ratio. The control system 101 may be configured to control the discharge ratio between the primary battery and the secondary battery of the vehicle 102, as disclosed in the present disclosure. The control system 101 may communicate with the vehicle 102 via the communication network 103 as shown in the figure.

The vehicle 102 may be any vehicle comprising the primary battery and the secondary battery. In an embodiment, the vehicle 102 may be one of an electric vehicle, a hybrid vehicle and so on. In an embodiment, the vehicle 102 may be one of a four-wheeler vehicle and a two-wheeler vehicle. In the environment 100a, the vehicle 102 may be illustrated to be a four-wheeler vehicle comprising the primary battery and the secondary battery. In an embodiment, the control system 101 may be embedded in the vehicle 102 for controlling the discharge ratio. In an embodiment, the control system 101 may be associated with one or more vehicles (not shown in figure). The control system 101 may be configured to control discharge ratio of primary battery and secondary battery of each of the one or more vehicles. In such scenario, the control system 101 may communicate with each of the one or more vehicles via the communication network 103. In an embodiment, the communication network 103 may include, without limitation, a direct interconnection, Controller Area Network (CAN), Local Interconnect Network (LIN), Local Area Network (LAN), Wide Area Network (WAN), wireless network (e.g., using Wireless Application Protocol), the Internet, and the like.

Further, the control system 101 includes a processor 104, I/O interface 105, one or more modules 106 and a memory 107. In some embodiments, the memory 107 may be communicatively coupled to the processor 104. The memory 107 stores processor executable instructions, which, on execution, may cause the control system 101 to control the discharge ratio between the primary battery and the secondary battery. The control system 101 may be implemented in a variety of computing systems, such as a laptop computer, a desktop computer, a Personal Computer (PC), a notebook, a smartphone, a tablet, e-book readers, a server, a network server, and the like.

In the environment 100b, an exemplary block diagram of the vehicle 102 along with the control system 101 may be illustrated. As shown in the figure, the vehicle 102 comprises components including, but not limiting to, a sensor unit 108, a battery system 109, a converter 110, an inverter 111 and a motor 112, which are associated with the control system 101, for controlling the discharge ratio. The sensor unit 108 may comprise one or more sensors associated with the vehicle 102. The one or more sensors may be configured to detect one or more sensor parameters of the vehicle 102. In an embodiment, the one or more sensor parameters may include, but are not limited to, Accelerator Pedal Position (APP), Rounds Per Minute (RPM), torque, motor load, slope data, road resistance, wind resistance, speed data, differential and double differential of discharge current with respect to time, associated with the vehicle 102.

The control system 101 may be configured to retrieve the one or more sensor parameters from the sensor unit 108 and estimate a power parameter required by the vehicle 102. The power parameter may be estimated based on the one or more sensor parameters. One or more techniques, known to a person skilled in the art may be implemented to estimate the power parameter based on the one or more sensor parameters.

Further, the discharge ratio may be identified based on the estimated power parameter and a function of power parameter by the control system 101. The identified discharge ratio may be provided to the battery system 109 of the vehicle 102. In an embodiment, the battery system 109 may include, but is not limited to, the primary battery, the secondary battery and an actuator associated with each of the primary battery and the secondary battery. In an embodiment, the actuator may be configured to receive the discharge ratio from the control system 101. Further, the actuator may be configured to actuate each of the primary battery and the secondary battery to contribute current based on the discharge ratio. The current contributed by each of the primary battery and the secondary battery may be provided to the converter 110. In an embodiment, the converter 110 may be a DC-DC converter configured to output amplified current from each of the primary battery and the secondary battery. The converter 110 may include two DC-DC converters and each of the two DC-DC converters may be associated with each of the primary battery and the secondary battery in the battery system 109. In an embodiment, output of the converter 110 may be sum of current contributed by the primary battery and the secondary battery. Further, the output of the converter 110 may be provided to the inverter 111 connected to the motor 112. The inverter 111 may be configured to convert DC current from the converter 110 to AC current. The AC current is provided to the motor 112 to drive the vehicle 102.

In the present disclosure, for identifying the discharge ratio between the primary battery and the secondary battery in the battery system 109 of the vehicle 102, the function of power parameter and the estimated power parameter are used. In an embodiment, the estimate power parameter may be one of power, current and torque associated with the vehicle 102. Said function may be associated with input of plurality of power parameters relating to the vehicle 102 and output of corresponding discharge ratio.

In an embodiment, the function of power parameter may be generated by the control system 101 to comprise one or more first power parameters from the plurality of power parameters.

The function of power parameter is generated such that current to be discharged from the secondary battery is zero for said one or more first power parameters.

In an embodiment, the function of power parameter may be generated by the control system 101 based on at least one of a drive cycle of the vehicle 102 and historic data associated with the plurality of power parameters of the vehicle 102. In an embodiment, for generating the function of power parameter, a plot comprising values of the plurality of power parameters for a predefined duration of time may be generated by the control system 101 using one of the drive cycle and the historic data.

Further, the plot may be divided into predefined number of bands, based on the values of the plurality of power parameters, by the control system 101. In an embodiment, each of the predefined number of bands correspond to one of a single value and range of values associated with the plurality of power parameters. In an embodiment, the predefined number of bands comprise first set of bands associated with the one or more first power parameters and second set of bands associated with one or more second power parameters from the plurality of power parameters. The first set of bands may be selected based on the battery capacity of the secondary battery and power parameter associated with each of the predefined number of bands. In an embodiment, the first set of bands is selected based on sum of the one or more second power parameters. The sum of the one or more second power parameters associated with the second set of bands is one of greater than and equal to the battery capacity of the secondary battery.

Upon dividing the plot to predefined number of bands, an optimal value of current may be determined by the control system 101, based on optimization in the control system 101. The optimal value of current may be current to be discharged by the primary battery for the second set of bands. Further, current to be discharged by the secondary battery for each of the second set of bands is computed by the control system 101. Said current may be computed based on total charge associated with respective band from the second set of bands and the optimal value of the primary battery current associated with corresponding band from the second set of bands. The discharge ratio associated with each of the plurality of power parameters is determined by the control system 101, based on the computed current of the secondary battery and the maximum current of the primary battery. The function of power parameter is generated by the control system 101 using the plurality of power parameter and corresponding discharge ratio.

In an embodiment, the optimization in the control system 101 to determine the optimal value associated with the primary battery may include to retrieve an error function by the control system 101. In an embodiment, the error function comprises maximum current associated with each of adjacent bands from the second set of bands, the optimal value associated with the primary battery and an error value. The optimal value associated with the primary battery may be varied by the control system 101. The optimal value may be varied until the error value is reduced to a minimal error value. Further, the varied optimal value associated with the minimal error value may be selected by the control system 101, as the optimal value of the current to be discharged by the primary battery for the predefined number of bands.

In an embodiment, the control system 101 may receive data for controlling the discharge ratio through the I/O interface 105 of the control system 101. The received data may include, but is not limited to, at least one of the one or more sensor parameters, the drive cycle, the historic data, the error function and so on. Also, the control system 101 may transmit data for controlling the discharge ratio via the I/O interface 105. The transmitted data may include, but is not limited to, the identified discharge ratio and so on. The I/O interface 105 may be coupled with the processor 104 of the control system 101.

Figure 2:
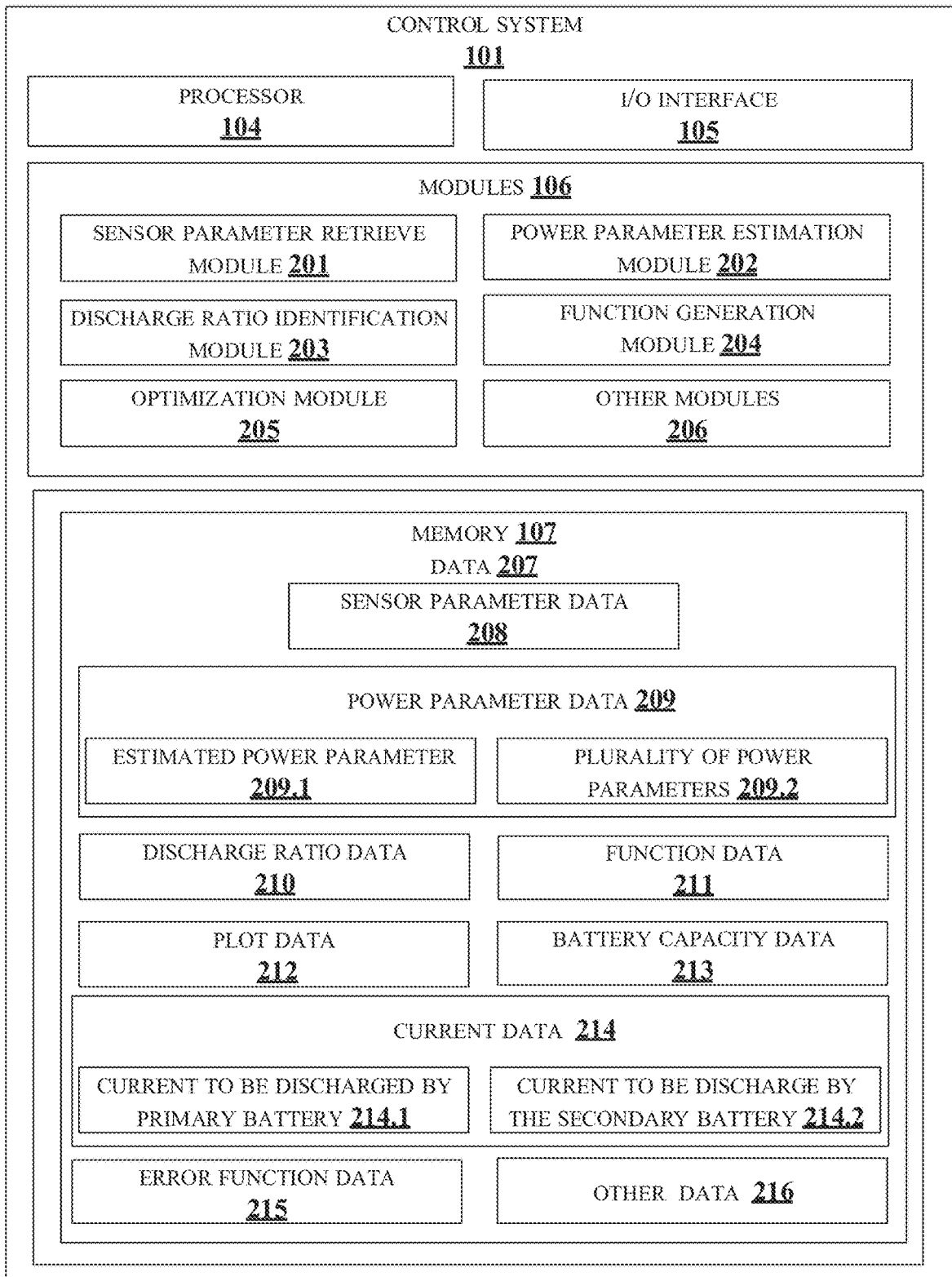
FIG. 2 shows a detailed block diagram of a control system for controlling discharge ratio between a primary battery and a secondary battery in a vehicle in accordance with some embodiments of the present disclosure.

FIG. 2 shows a detailed block diagram of the control system 101 for controlling the discharge ratio in accordance with some embodiments of the present disclosure.

The data 207 in the memory 107 and the one or more modules 106 of the control system 101 may be described herein in detail.

In one implementation, the one or more modules 106 may include, but are not limited to, a sensor parameter retrieve module 201, a power parameter estimation module 202, a discharge ratio identification module 203, a function generation module 204, an optimization module 205, and one or more other modules 206, associated with the control system 101.

In an embodiment, the data 207 in the memory 107 may comprise sensor parameter data 208 (also referred to as one or more sensor parameters 208), power parameter data 209 (also referred to as at least one of estimated power parameter 209.1 and plurality of power parameters 209.2), discharge ratio data 210 (also referred to as discharge ratio 210), function data 211 (also referred to as function of power parameter 211), plot data 212 (also referred to as plot 212), battery capacity data 213 (also referred to as battery capacity 213), current data 214 (also referred to as at least one of current to be discharged by primary battery 214.1, current to be discharge by the secondary battery 214.2), error function data 215 (also referred to as error function 215) and other data 216 associated with the control system 101.

In an embodiment, the data 207 in the memory 107 may be processed by the one or more modules 106 of the control system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The one or more modules 106 when configured with the functionality defined in the present disclosure may result in a novel hardware.

For controlling, the discharge ratio 210 between the primary battery and the secondary battery, sensor parameter retrieve module 201 may be configured to receive the one or more sensor parameters 208 associated with the vehicle 102. In an embodiment, the one or more sensor parameters 208 may include, but are not limited to, the APP, the RPM, the torque, the motor load, the slope data, the road resistance, the wind resistance, the speed data, the differential and double differential of discharge current with respect to time, associated with the vehicle 102. In an embodiment, each of the one or more sensor parameters 208 may be detected by corresponding sensors embedded in the vehicle 102. The one or more sensor parameters 208 may be directly dynamically retrieved from the respective sensors. In an embodiment, the one or more sensor parameters 208 may be detected and stored in a memory associated with the sensors and may be retrieved by the sensor parameter retrieve module 201 when controlling the discharge ratio 210 of the vehicle 102.

Upon retrieving the one or more sensor parameters 208, the power parameter estimation module 202 may be configured to estimate the power parameter 209.1 required by the vehicle 102. The power parameter 209.1 may be estimated based on the one or more sensor parameters 208. One or more techniques, known to a person skilled in the art may be implemented to estimate the power parameter 209.1 based on the one or more sensor parameters 208. In an embodiment, the estimated power parameter 209.1 may be one of power, current and torque that may be required by the motor 112 of the vehicle 102 to drive the vehicle 102. For example, consider the one or more sensor parameters 208 to be the torque and the RPM associated with the vehicle 102 and the power parameter 209.1 to be estimated may be the power. The power parameter 209A may be estimated by computing product of the torque and the RPM as in equation 1, given below:

$$\text{Power parameter} = \text{Torque} * \text{RPM} \quad (1)$$

Upon estimating the power parameter 209.1, the discharge ratio identification module 203 may be configured to identify the discharge ratio 210 based on the estimated power parameter 209.1 and the function of power parameter 211. The identified discharge ratio 210 may be provided to the battery system 109 of the vehicle 102, as described previously.

In the present disclosure, for identifying the discharge ratio 210 between the primary battery and the secondary battery in the battery system 109 of the vehicle 102, the function of power parameter 211 and the estimated power parameter 209.1 may be used. In an embodiment, the estimated power parameter 209.1 may be one of power, current and torque associated with the vehicle 102. In an embodiment, the function of power parameter 211 may be any function which may be associated with input as the power parameter 209.1 and output as discharge ratio corresponding to the inputted power parameter. In a non-limiting embodiment, the function of power parameter 211 may be, a look-up table, a regression function, an approximation function and so on. Consider the function of power parameter 211 may be the look-up table. The look-up table may comprise columns for plurality of power parameters 209.2 and discharge ratio. Each of rows of the look-up table may indicate a value of a power parameter from the plurality of power parameters 209.2 and corresponding discharge ratio. When the power parameter is inputted in the look-up table, corresponding row in the look-up table may be identified and respective discharge ratio may be retrieved from the look-up table. In an embodiment, each of the rows of the look-up table may correspond to a range of values of plurality of power parameters 209.2, as shown in Table 1 below:

TABLE 1

| Power parameter in Volts(V) | Discharge ratio |
| --- | --- |
| 0 V-1 V | 1:0 |
| 1.1 V-2 V | 4:1 |
| 2.1 V-3 V | 3:1 |
| 3.1 V-4 V | 2:1 |

Consider the estimated power parameter 209.1 is 2.2V, then the discharge ratio 210 may be identified to be 4:1.

Similarly, consider the estimated power parameter 209.1 is 3.9V, then the discharge ratio 210 may be identified to be 2:1.

In an embodiment, each of the rows of the look-up table may correspond to a single value of plurality of power parameters 209.2, as shown in Table 2 given below:

TABLE 2

| Power parameter in Volts(V) | Discharge ratio |
|---|---|
| 1 V | 1:0 |
| 2 V | 4:1 |
| 3 V | 3:1 |
| 4 V | 2:1 |

Consider the estimated power parameter 209.1 is 3V, then the discharge ratio 210 may be identified to be 3:1. Similarly, consider the estimated power parameter 209.1 is 1V, then the discharge ratio 210 may be identified to be 1:0. In an embodiment, consider the estimated power parameter 209.1 may be of value not present in the column of Table 2, the discharge ratio 210 associated with power parameter with value nearest to said estimated power parameter may be selected. For example, consider the estimated power parameter 209.1 is 3.6V, then the discharge ratio 210 associated with power parameter 4V may be selected, i.e., discharge ratio 210 2:1 may be selected. Similarly, consider the estimated power parameter 209.1 is 0.5V, then the discharge ratio 210 associated with power parameter 1V may be selected, i.e., discharge ratio 1:0 may be selected.

In an embodiment, the regression function may be used as the function of power parameter 211 for identifying the discharge ratio 210. The regression function may be one of a linear regression function, a logistic regression function, a polynomial regression function, a stepwise regression function, a ridge regression function, a lasso regression function and an ElasticNet regression function. One or more techniques relating to regression function may be used for identifying the discharge ratio 210.

In the present disclosure, the function generation module 204 in the control system 101 may be configured to generate the function of power parameter 211. The function of power parameter 211 may be generated to comprise the plurality of parameters 209.2. The plurality of parameters 209.2 may comprise one or more first power parameters and one or more second plurality of parameters. In an embodiment, the one or more first power parameters may be associated with lower value of the plurality of power parameters 209.2 and the one or more second power parameters may be associated with higher values of the plurality of power parameters 209.2. The function of power parameter 211 may be generated such that current 214.1 to be discharged from the secondary battery is zero for the one or more first power parameters. By this, the utilization of the secondary battery during the low current demand of the vehicle 102 may be eliminated.

In an embodiment, the function generation module 204 may be configured to generate the function of power parameter 211 based on at least one of the drive cycle of the vehicle 102 and the historic data associated with the plurality of power parameters 209.2 of the vehicle 102. In an embodiment, the generation of the function of power parameter 211 based on the historic data associated with the plurality of power parameters 209.2 include monitoring and storing values of power parameters associated with the vehicle 102. The values of the plurality of power parameters 209.2 may be monitored for a predefined duration of time and stored in a power parameter database associated with the vehicle 102. In an embodiment, the values of the plurality of power parameter 209.2 may be dynamically retrieved by the control system 101, from the vehicle 102 and stored in the memory 107 of the control system 101. The function generation module 204 may retrieve the historic data when generating the function of power parameter 211.

Figure 6A:
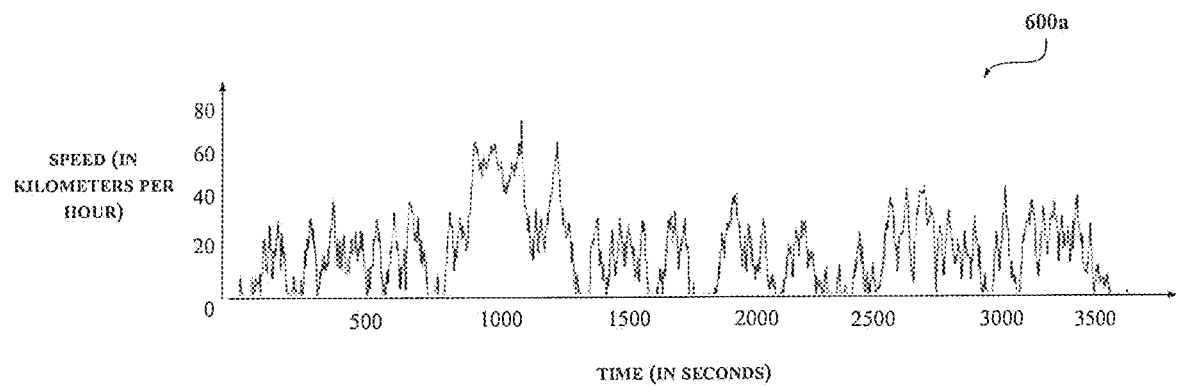
FIG. 6a shows an exemplary representation of a drive cycle of a vehicle n accordance with some embodiments of present disclosure.

In an embodiment, the generation of the function of power parameter 211 based on the drive cycle of the vehicle 102 include monitoring speed of the vehicle 102 for the predefined duration of time. FIG. 6a shows an exemplary representation of the drive cycle 600a of the vehicle 102. In an embodiment, the drive cycle may represent the slope data, the wind resistance, the road resistance and the like. In an embodiment, the drive cycle may be used to access the performance of the vehicle 102. The function generation module 204 may dynamically retrieve the drive cycle front a drive cycle generation unit associated with the vehicle 102. In an embodiment, the drive cycle of the vehicle 102 may be stored in a drive cycle database associated with the vehicle 102. The stored drive cycle may be retrieved by the function generation module 204 when generating the function of power parameter 211. In an embodiment, the control system 101 may be configured to determine at least one of the historic data and the drive cycle for generating the function of power parameter 211.

Figure 6B:
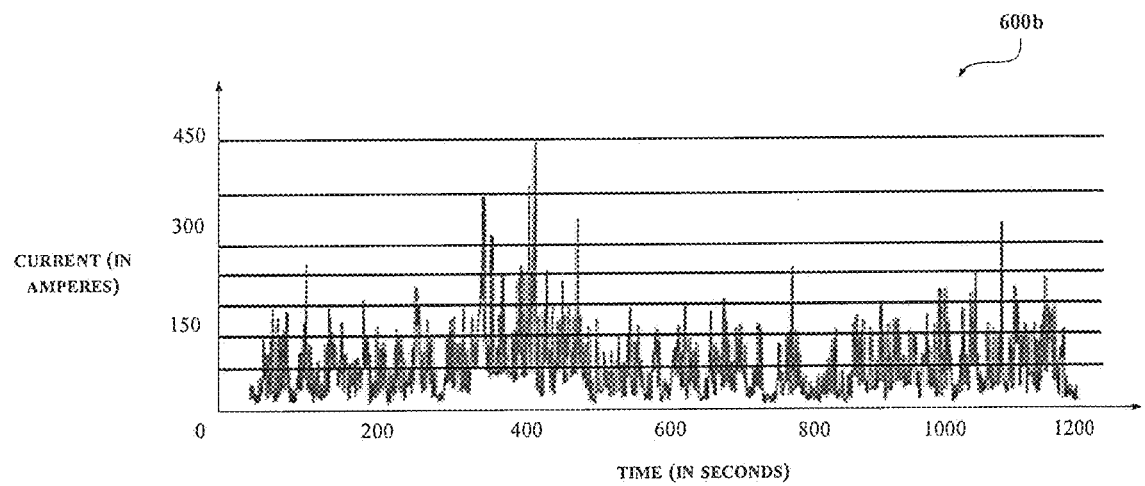
FIG. 6b shows an exemplary representation of a plot generated using a drive cycle of a vehicle in accordance with some embodiments of present disclosure.

Further, the function generation module 204 may be configured to generate the plot 212 based on one of the historic data and the drive cycle. In an embodiment, the plot 212 comprises the values of the plurality of power parameters 209.2 for the predefined duration of time. For example, consider the power parameter may be current associated with the vehicle 102. FIG. 6b shows an exemplary representation of the plot 600b, plotted using the drive cycle 600a.

Figure 6C:
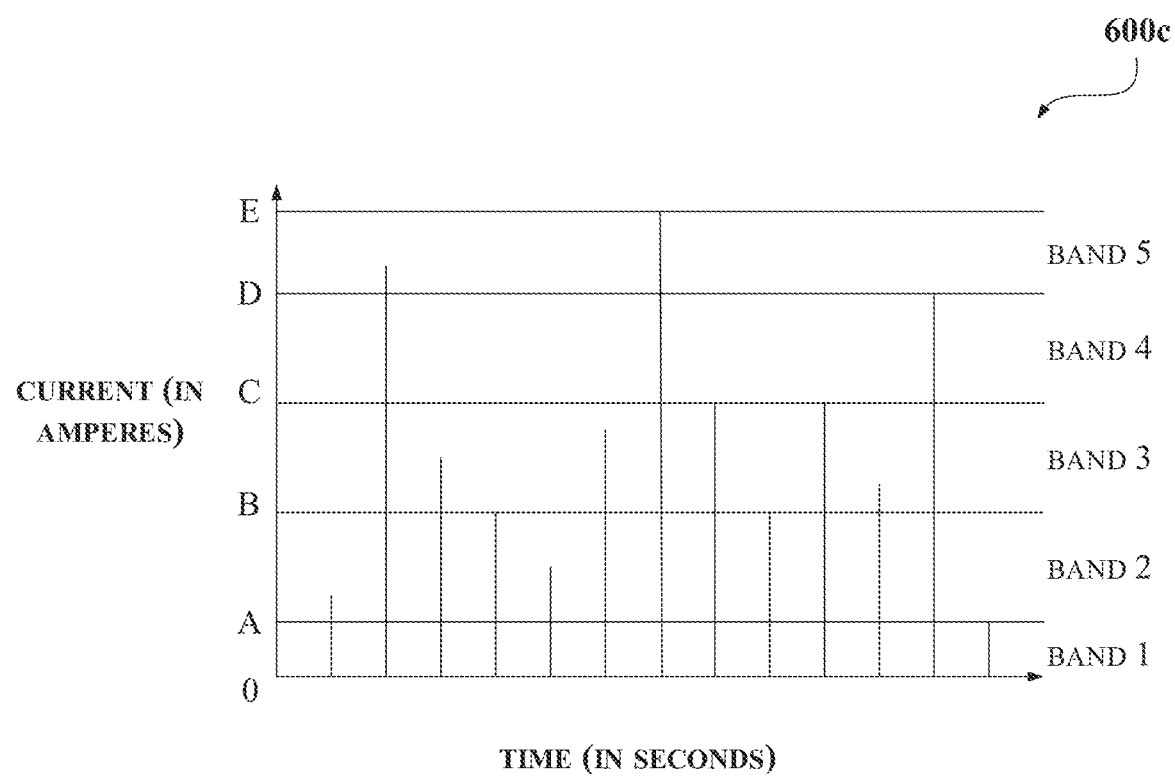
FIG. 6c shows an exemplary representation of a sampled plot with predefined number of bands in accordance with some embodiments of present disclosure.

Upon generating the plot 600b, the function generation module 204 may be configured to sample the plot 600b to obtain a sampled plot 600c as shown in FIG. 6c. Further, the function generation module 204 may be configured to divide the plot 600c into the predefined number of bands based on the values of the plurality of power parameters 209.2. As shown in FIG. 6c, the predefined number of bands may be BAND 1, BAND 2, BAND 3, BAND 4 and BAND 5. In an embodiment, each of the predefined number of bands correspond to one of a single value and range of values associated with the plurality of power parameters 209.2. For example, when each of the predefined number of bands corresponds to the single value, each of the plurality of power parameters 209.2 may be associated with a band from the predefined number of bands, as illustrated in Table 2. When each of the predefined number of bands corresponds to range of value, range of values from values of each of the plurality of power parameters 209.2 may be associated with a band from the predefined number of bands, as illustrated in Table 1. For example, in plot 600c, BAND 1 may be associated with value '0' to value 'A' of the current, BAND 2 may be associated with value 'A' to value 'B' of the current, BAND 3 may be associated with value 'B' to value 'C' of the current, BAND 4 may be associated with value 'C' to value 'D' of the current and BAND 5 may be associated with value 'D' to value 'E' of the current.

Further, the predefined number of bands may include the first set of bands and the second set of bands from the predefined number of bands. The first set of bands may be associated with the one or more first parameters from the plurality of parameters 209.2 and the second set of bands may be associated with the one or more second parameters from the plurality of parameters 209.2. In the present disclosure, the function of power parameter 211 may be generated such that the current 214.2 discharged front the secondary battery may be zero for said one or more first power parameters. As described previously, the one or more first power parameters may be associated with lower value of the plurality of power parameters 209.2 and the one or more second power parameters may be associated with higher values of the plurality of power parameters 209.2. One or more techniques, known to a person skilled in the art may be implemented for identifying the one or more first power parameters and the one or more second power parameters.

In an embodiment, the first set of bands, corresponding to the one or more first power parameters may be selected based on the battery capacity 213 of the secondary battery and the power parameter associated with each of the predefined number of bands. In an embodiment, sum of power parameters of the one or more second power parameters may be computed by the function generation module 204 to select the first set of bands. Upon computing the sum, the sum may be compared with the battery capacity 213 of the secondary battery. The sum of the one or more second power parameters associated with the second set of bands is one of greater than and equal to the battery capacity 213 of the secondary battery. Power parameters other than the one or more second power parameters may be selected to be the one or more first parameters. For example, from the plot 600c, consider the sum of currents associated with BAND 3, BAND 4 and BAND 5 is greater than the battery capacity 213 of the secondary battery. Hence, the first set of bands may be selected to be BAND 1 and BAND 2. Hence, the current 214.2 to be discharged by the secondary battery may be zero for BAND 1 and BAND 2.

Further, upon dividing the plot 600c into the predefined number of bands, the function generation module 204 may be configured to determine the optimal value of current 214.1 to be discharged by the primary battery for the second set of bands. The optimal value may be determined based on the optimization in the control system 101.

The optimization module 205 of the control system 101 may be configured to perform the optimization in the control system 101. In an embodiment, the optimization may include retrieving the error function 215 by the optimization module 205. In an embodiment, the error function 215 may be as in equation 2 given below:

$$Err = \sum_{\substack{a \le i \le b \\ a \le i \le b \\ i \ne j}} \left( \frac{Imax_i * X_i}{X_i + 1} - \frac{Imax_j * X_j}{X_j + 1} \right)^2 \quad (2)$$

where, Err may be an error value;
$Imax_i$ may be maximum current associated with $i^{th}$ band;
$Imax_j$ may be maximum current associated with $j^{th}$ band;
$X_i$ may be the optimal value associated with the primary battery for the $i^{th}$ band;
$X_j$ may be the optimal value associated with the primary battery for the $j^{th}$ band;
'a' may be a band associated with lower value of power parameter amongst the one or more second parameters; and
'b' may be a band associated with highest value of power parameter amongst the one or more second parameters.

From the example illustrated previously, 'a' from equation 2 may be BAND 3 and 'b' from equation 2 may be BAND 5.

In the error function 215, the optimal value associated with the primary battery may be varied by optimization module 205 until the error value is reduced to a minimal error value. In an embodiment, the minimal error value may be value '0'. In a non-limiting embodiment, the minimal error value may be any value nearer to the value '0'.

Further, the varied optimal value associated with the minimal error value may be selected by the optimization module 205, as the optimal value of the current 214.1 to be discharged by the primary battery for the predefined number of bands.

Upon determining the optimal value, the current 214.2 to be discharged by the secondary battery for each of the second set of bands is computed by the function generation module 204. Said current may be computed based on total charge associated with respective band from the second set of bands and the optimal value of the primary battery current associated with corresponding band from the second set of bands. In an embodiment, the current 214.2 to be discharged by the secondary battery may be computed using equation 3 given below:

$$\text{Battery capacity of secondary battery} = \sum_{i=a}^{b} \frac{C_i}{X_i + 1} \quad (3)$$

where, $C_i$ may be the total charge associated with respective band from the second set of bands.

Figure 6D:
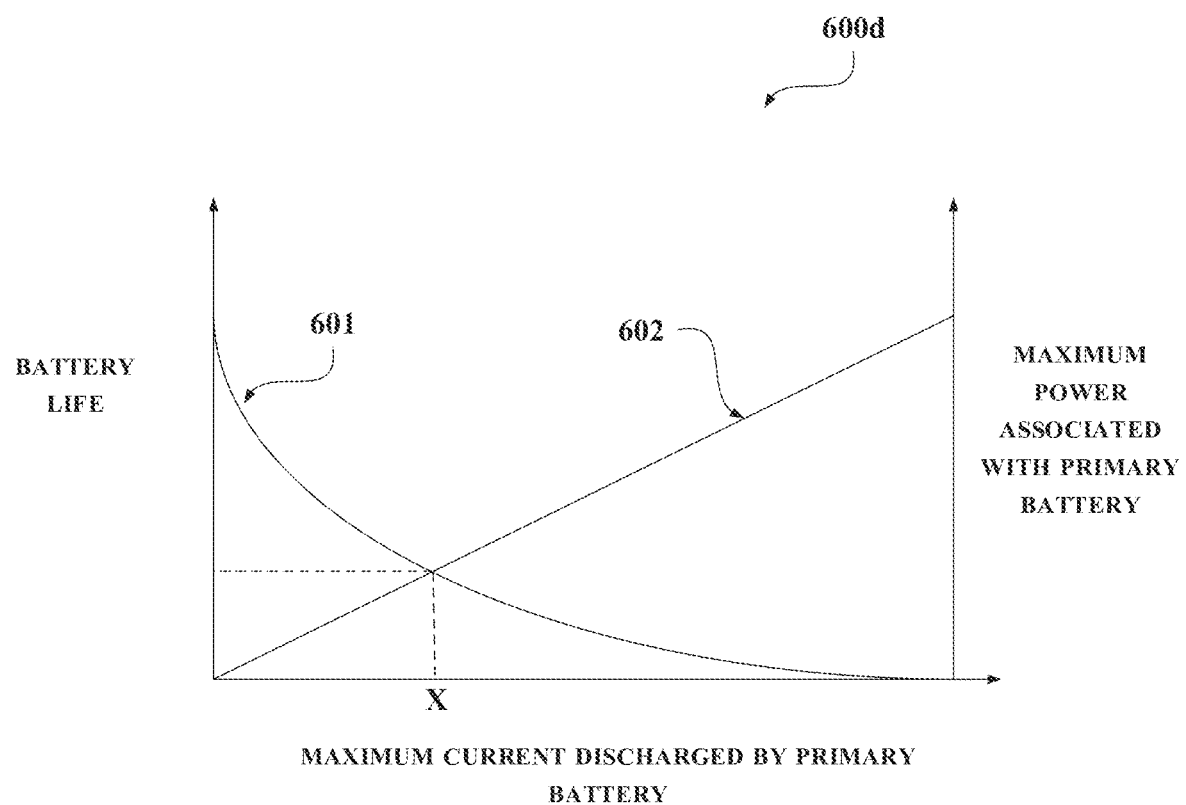
FIG. 6d shows an exemplary representation of a graph illustrating relation between battery life and maximum current discharged by primary battery in accordance with some embodiments of present disclosure.

The discharge ratio associated with each of the plurality of power parameters is determined by the control system 101, based on the computed current of the secondary battery and the maximum current of the primary battery. The function of power parameter 211 is generated by the control system 101 using the plurality of power parameters 209.2 and corresponding discharge ratio. The proposed way of generation of the function of power parameter 211 provision to use optimal value of the current 214.1 to be discharged from the primary battery. FIG. 6d shows an exemplary representation of a graph 600d illustrating relation between battery life and maximum current discharged by primary battery in accordance with some embodiments of present disclosure. Line 602 from the figure indicates exponential decrease of the battery life of the primary battery with increase in the maximum current discharged by the primary battery. It may be understood to a person skilled in the art that lower the maximum current discharged by the primary battery, longer may be the battery life of the primary battery. Hence, at the high current demand in the vehicle, the secondary battery may be used along with the primary battery, where the maximum current of the primary battery may be minimized. Line 602 indicates linear variation of maximum power associated with the primary battery with respect to the maximum current discharged by the primary battery. In the graph 600d, for a particular estimated power parameter, the optimum value of the current discharged by the primary battery is value 'X'. By maintaining the current at the value 'X', the battery life of the primary battery may also be saved. In an embodiment, power delivery by the primary battery may be negatively impacted, if the current 214.1 to be discharged is lesser than the optimal value 'X'.

In an embodiment, the control system 101 may receive data for controlling the discharge ratio 210 through the I/O interface 105 of the control system 101. The received data may include, but is not limited to, at least one of the one or more sensor parameters 208, the drive cycle, the historic data, the error function 215 and so on. Also, the control system 101 may transmit data for controlling the discharge ratio 210 via the I/O interface 105. The transmitted data may include, but is not limited to, the identified discharge ratio 210 and so on. The I/O interface 105 may be coupled with the processor 104 of the control system 101.

The other data 216 may store data, including temporary data and temporary files, generated by modules for performing the various functions of the control system 101. The one or more modules 106 may also include other modules 206 to perform various miscellaneous functionalities of the control system 101. It will be appreciated that such modules may be represented as a single module or a combination of different modules.

Figure 3:
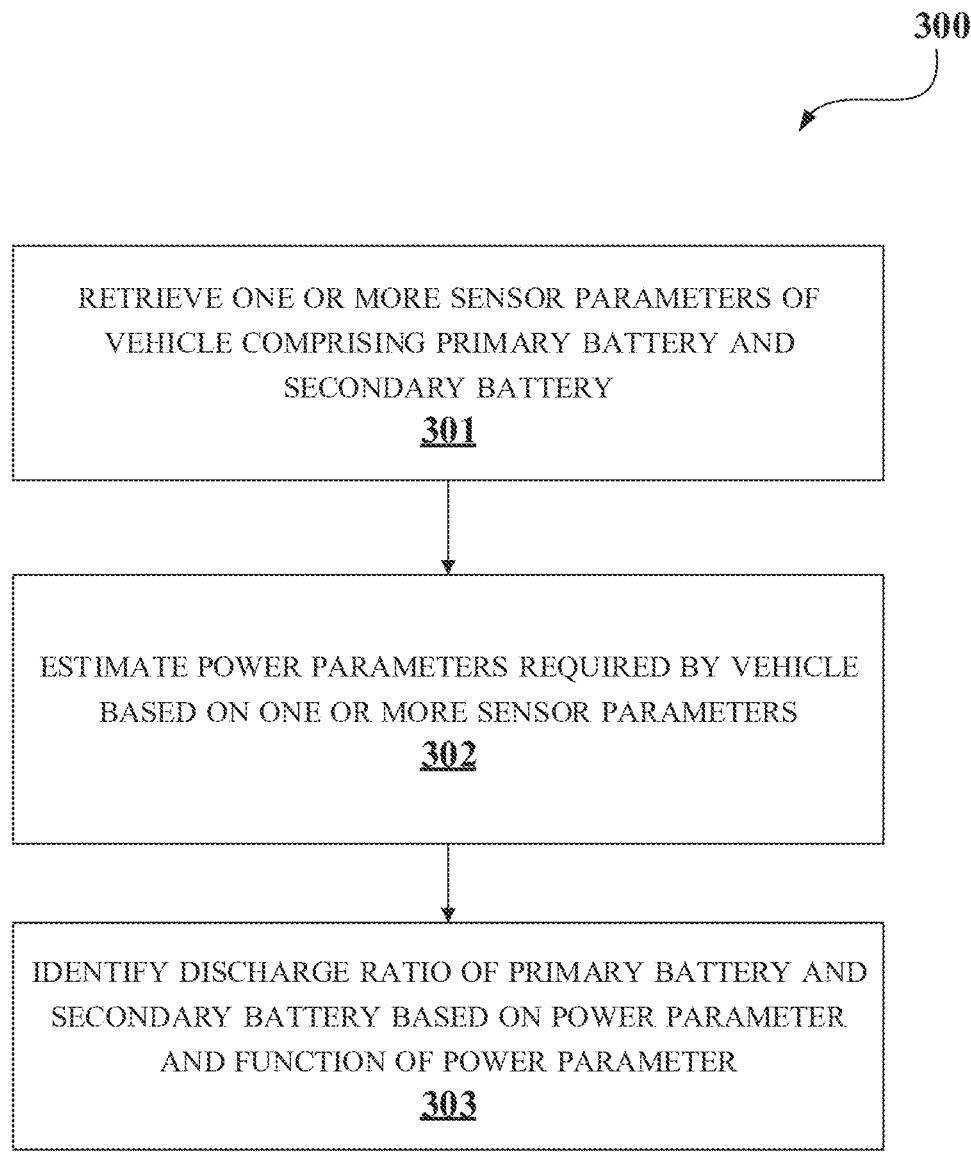
FIG. 3 illustrates a flowchart showing an exemplary method for controlling discharge ratio between a primary battery and a secondary battery in a vehicle, in accordance with some embodiments of present disclosure.

FIG. 3 illustrates a flowchart showing an exemplary method for controlling the discharge ratio 210 between the primary battery and the secondary battery in the vehicle 102, in accordance with some embodiments of present disclosure.

At block 301, the sensor parameter retrieve module 201 may retrieve the one or more sensor parameters 208 of the vehicle 102. The one or more sensor parameters 208 may include, but are not limited to, the APP, the RPM, the torque, the motor load, the slope data, the road resistance, the wind resistance, the speed data, the differential and double differential of discharge current with respect to time, associated with the vehicle 102.

At block 302, the power parameter estimation module 202 may estimate the power parameter 209.1 required by the vehicle 102, based on the one or more sensor parameters 208.

At block 303, the discharge ratio identification module 203 may identify the discharge ratio 210 between the primary battery and the secondary battery based on the estimated power parameter 209.2 and the function of power parameter 211. The function of power parameter 211 may be associated with input of the plurality of power parameters 209.2 relating to the vehicle 102 and output of the corresponding discharge ratio.

Figure 4:
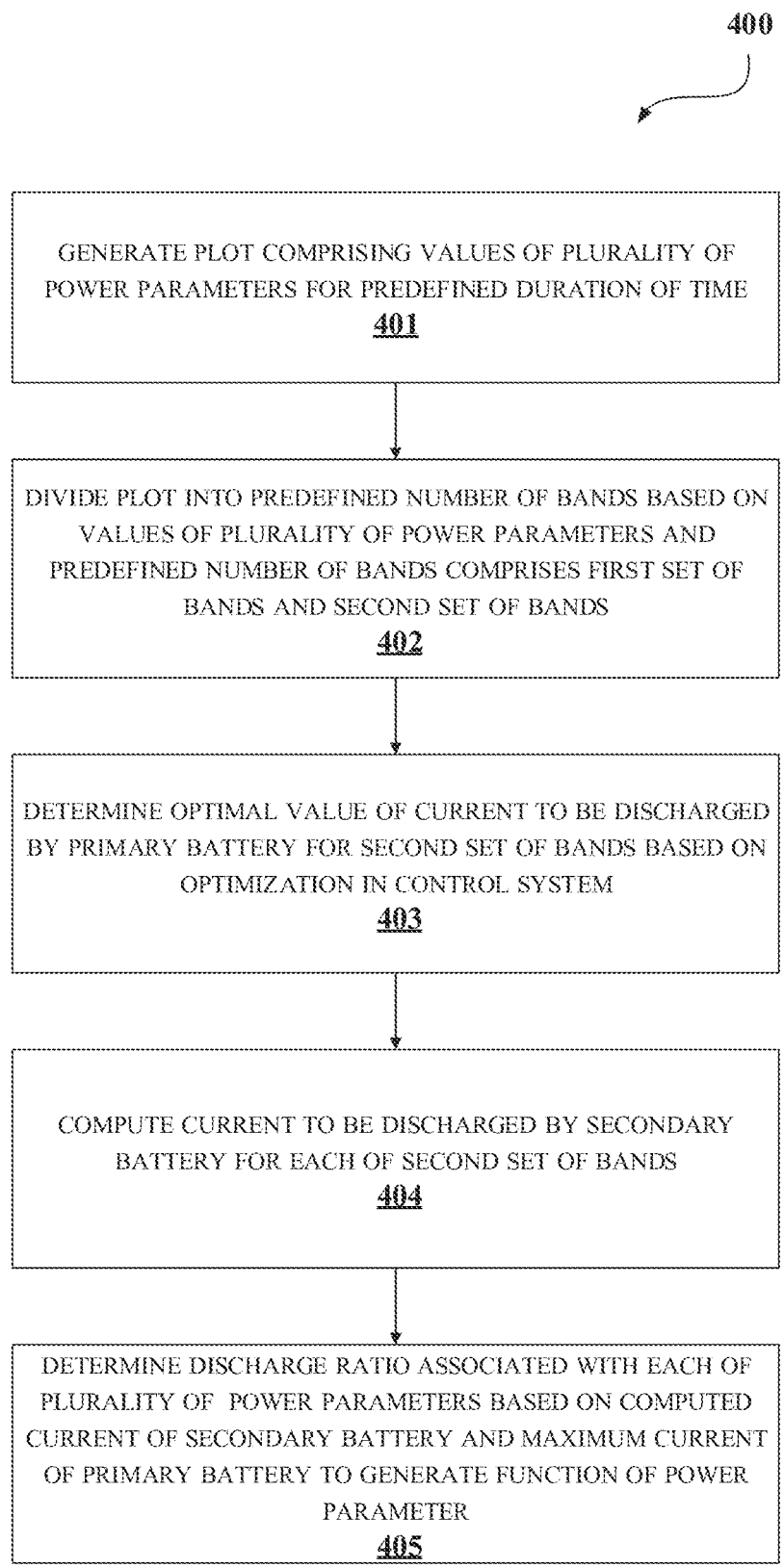
FIG. 4 illustrates a flowchart showing an exemplary method for generating function of power parameter in accordance with some embodiments of present disclosure.

FIG. 4 illustrates a flowchart showing an exemplary method for generating the function of power parameter 211 in accordance with some embodiments of present disclosure.

At block 401, the function generation module 204 may generate the plot 212 comprising values of the plurality of power parameters 209.2 for the predefined duration of time, using one of the drive cycle and the historic data.

At block 402, the function generation module 204 may divide the plot 212 into the predefined number of bands based on values of the plurality of power parameters 209.2. The predefined number of bands comprises the first set of bands associated with the one or more first power parameters and the second set of bands associated with the one or more second power parameters. The first set of bands is selected based on the battery capacity 213 of the secondary battery and power parameter associated with each of the predefined number of bands.

Figure 5:
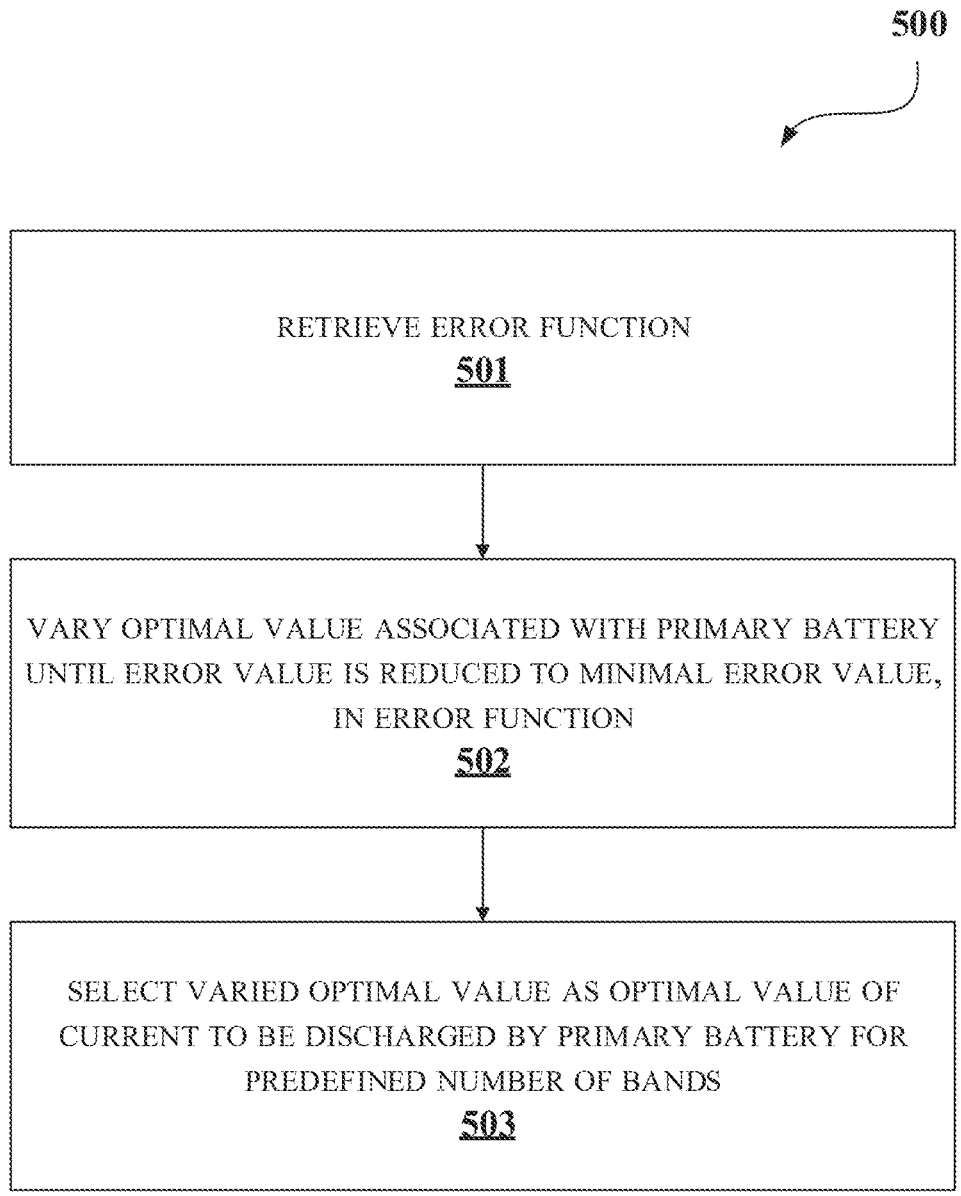
FIG. 5 illustrates a flowchart showing an exemplary method for optimization in control system in accordance with some embodiments of present disclosure.

At block 403, the function generation module 204 may determine the optimal value of the current 214.1 to be discharged by the primary battery for the second set of bands. The optimal value may be determined based on the optimization in the control system 101. FIG. 5 illustrates a flowchart showing an exemplary method for the optimization in the control system 101 in accordance with some embodiments of present disclosure.

At block 501, the optimization module 205 may retrieve the error function 215. The error function 215 may comprise maximum current associated with each of the adjacent bands from the second set of bands, the optimal value associated with the primary battery and the error value.

At block 502, the optimization module 205 may vary the optimal value associated with the primary battery until error value is reduced to the minimal error value. In an embodiment, the minimal error value may be zero.

At block 503, the optimization module 205 may select the varied optimal value associated with the minimal error value as the optimal value of the current 214.1 to be discharged by the primary battery for the predefined number of bands.

Referring back to FIG. 4, At block 404, the function generation module 204 computes the current 214.2 to be discharged by the secondary battery for each of the second set of bands. Said current may be computed based on the total charge associated with respective band from the second set of bands and the optimal value of the primary battery current associated with corresponding band from the second set of bands.

At block 405, the function generation module 204 determines the discharge ratio 210 associated with each of the plurality of power parameters 209.2 based on the computed current of the secondary battery and the maximum current of the primary battery.

As illustrated in FIGS. 3, 4 and 5, the methods 300, 400 and 500 may include one or more blocks for executing processes in the control system 101. The methods 300, 400 and 500 may be described in the general context of computer executable instructions. Generally, computer executable instructions can include routines, programs, objects, components, data structures, procedures, modules, and functions, which perform particular functions or implement particular abstract data types.

The order in which the methods 300, 400 and 500 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 7:
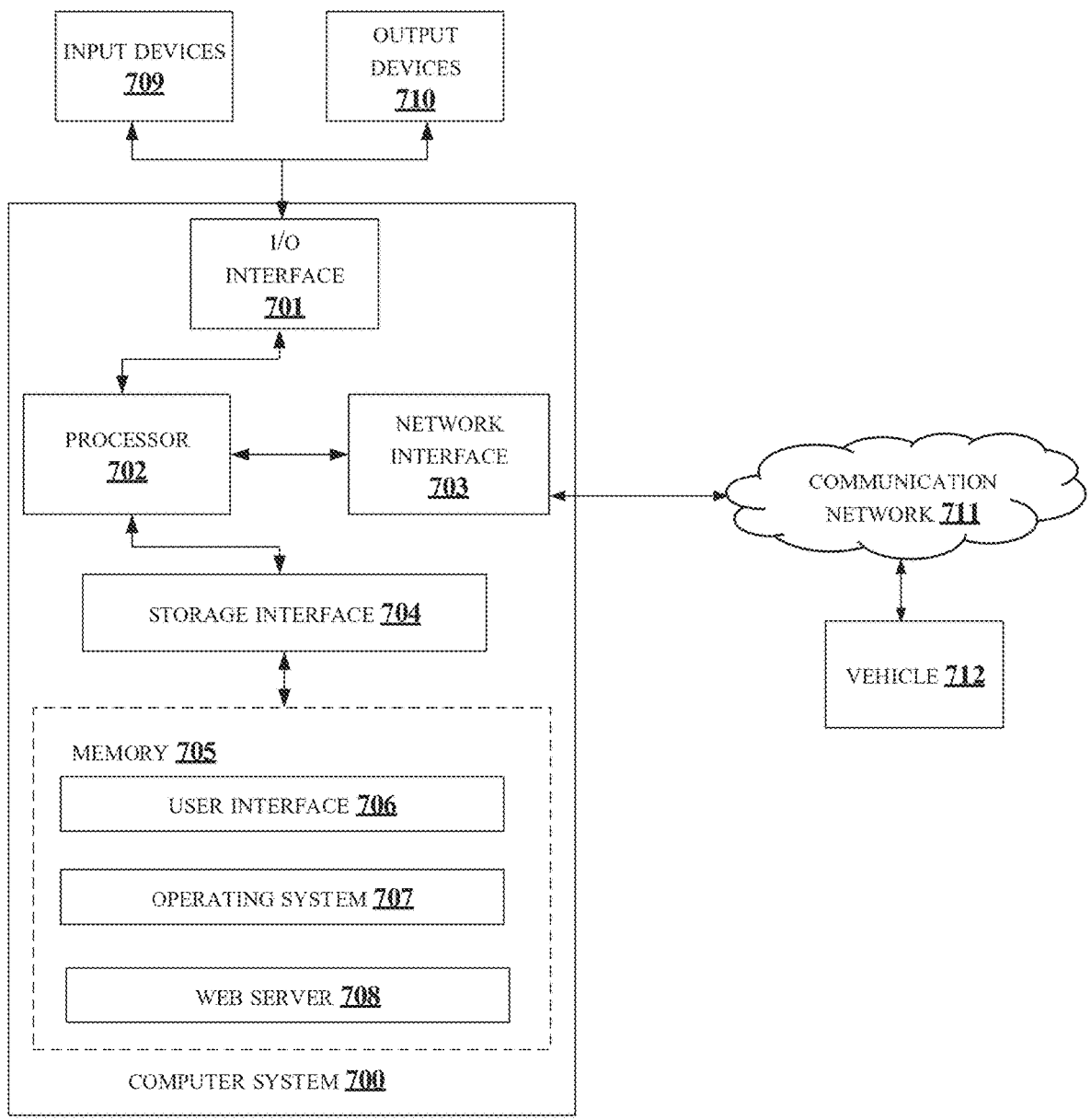
FIG. 7 illustrates a block diagram of an exemplary computer system for implementing embodiments consistent with the present disclosure.

FIG. 7 illustrates a block diagram of an exemplary computer system 700 for implementing embodiments consistent with the present disclosure. In an embodiment, the computer system 700 is used to implement the control system 101 disclosed in the present disclosure. The computer system 700 may include a central processing unit ("CPU" or "processor") 702. The processor 702 may include at least one data processor for executing processes in Virtual Storage Area Network. The processor 702 may include specialized processing units such as, integrated system (bus) controllers, memory management control units, floating point units, graphics processing units, digital signal processing units, etc.

The processor 702 may be disposed in communication with one or more input/output (I/O) devices 709 and 710 via I/O interface 701. The I/O interface 701 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices 709 and 710. For example, the input devices 709 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 710 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 may consist of the control system 101. The processor 702 may be disposed in communication with the communication network 711 via a network interface 703. The network interface 703 may communicate with the communication network 711. The network interface 703 may employ connection protocols including, without limitation, direct connect, Ethernet (e.g, twisted pair 10/100/1000 Base T), transmission control protocol/internet protocol (TCP/IP), token ring, IEEE 802.11a/b/g/n/x, etc. The communication network 711 may include, without limitation, a direct interconnection, local area network (LAN), wide area network (WAN), wireless network (e.g., using Wireless Application Protocol), the Internet, etc. Using the network interface 703 and the communication network 711, the computer system 700 may communicate with a vehicle 712 for controlling discharge ratio between primary battery and secondary battery in the vehicle 712. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 711 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707 etc. In some embodiments, computer system 700 may store user/application data, such as, the data, variables, records, etc., as described in this disclosure. Such databases may be implemented as fault-tolerant, relational, scalable, secure databases such as Oracle® or Sybase®.

The operating system 707 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages

An embodiment of the present disclosure discloses a method for efficient utilization of primary and secondary battery in a vehicle.

An embodiment of the present disclosure discloses an intelligent mechanism for steering current between primary and secondary battery of a vehicle.

An embodiment of the present disclosure provisions usage of secondary battery at high current demand of the vehicle only. The secondary battery retains charges at low current demand to protect the primary battery. By this, life cycle of both the primary battery and the secondary battery may be enhanced.

An embodiment of the present disclosure provisions a function of power parameter with optimal value of current discharged from the primary battery. By this, extra high currents from the battery, when driving motor of the vehicle, may be reduced to zero.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3, 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100a and 100b | Environments |
| 101 | Control system |
| 102 | Vehicle |
| 103 | Communication network |
| 104 | Processor |
| 105 | I/O interface |
| 106 | Modules |
| 107 | Memory |
| 108 | Sensor unit |
| 109 | Battery system |
| 110 | Converter |
| 111 | Inverter |
| 112 | Motor |
| 201 | Sensor parameter retrieve module |
| 202 | Power parameter estimation module |
| 203 | Discharge ratio identification module |
| 204 | Function generation module |
| 205 | Optimization module |
| 206 | Other modules |
| 207 | Data |
| 208 | Sensor parameter data |
| 209 | Power parameter data |
| 210 | Discharge ratio data |
| 211 | Function data |
| 212 | Plot data |
| 213 | Battery capacity data |
| 214 | Current data |
| 215 | Error function data |
| 216 | Other data |
| 600a | Drive cycle |
| 600b | Plot |
| 600c | Sampled plot |
| 600d | Graph |
| 700 | Computer System |
| 701 | I/O Interface |
| 702 | Processor |
| 703 | Network Interface |
| 704 | Storage Interface |
| 705 | Memory |
| 706 | User Interface |
| 707 | Operating System |
| 708 | Web Server |
| 709 | Input Devices |
| 710 | Output Devices |

| Reference Number | Description |
| --- | --- |
| 711 | Communication Network |
| 712 | Vehicle |

We claim:

1. A method for controlling a discharge ratio between a primary battery and a secondary battery in a vehicle, comprising:
retrieving, by a control system, one or more sensor parameters of the vehicle;
estimating, by the control system, a power parameter required by the vehicle based on the one or more sensor parameters; and
identifying, by the control system, the discharge ratio corresponding to the power parameter, between the primary battery and the secondary battery, based on a function of power parameter, wherein the function of power parameter is associated with input of a plurality of power parameters of the vehicle and output of corresponding discharge ratio, to control the discharge ratio between the primary battery and the secondary battery in the vehicle,
wherein the function of power parameter is generated based on at least one of a drive cycle of the vehicle and historic data associated with the plurality of power parameters of the vehicle, and
wherein generating the function of power parameter based on at least one of the drive cycle and the historic data comprises:
generating, by the control system, a plot comprising values of the plurality of power parameters of the vehicle for a predefined duration of time, using one of the drive cycle and the historic data;
dividing, by the control system, the plot into predefined number of bands based on the values of the plurality of power parameters of the vehicle, wherein the predefined number of bands comprises first set of bands associated with the one or more first power parameters and second set of bands associated with one or more second power parameters from the plurality of power parameters of the vehicle, said first set of bands is selected based on battery capacity of the secondary battery and the power parameter associated with each of the predefined number of bands;
determining, by the control system, an optimal value of current to be discharged by the primary battery for the second set of bands, based on optimization in the control system;
computing, by the control system, current to be discharged by the secondary battery, for each of the second set of bands, based on total charge associated with respective band from the second set of bands and the optimal value of the primary battery current associated with corresponding band from the second set of bands;
determining, by a control system, the discharge ratio associated with each of the plurality of power parameters of the vehicle based on the computed current of the secondary battery and a maximum current of the primary battery, to generate the function of power parameter.

2. The method as claimed in claim 1, wherein the function of power parameter comprises one or more first power parameters from the plurality of power parameters of the vehicle, wherein current to be discharged from the secondary battery is zero for said one or more first power parameters.

3. The method as claimed in claim 1, wherein sum of the second power parameter associated with the second set of bands is one of greater than and equal to the battery capacity of the secondary battery.

4. The method as claimed in claim 1, wherein each of the predefined number of bands correspond to one of a single value and range of values associated with the plurality of power parameters of the vehicle.

5. The method as claimed in claim 1, wherein the determining the optimal value of current to be discharged by the primary battery comprises
retrieving, by the control system, an error function comprising maximum current associated with each of adjacent bands from the second set of bands, the optimal value associated with the primary battery and an error value calculated by the error function;
varying, by the control system, the optimal value associated with the primary battery until the error value is reduced to a minimal error value;
selecting, by the control system, a varied optimal value associated with the minimal error value as the optimal value of the current to be discharged by the primary battery for the second set of bands.

6. The method as claimed in claim 1, wherein the one or more sensor parameters comprises at least one of Accelerator Pedal Position (APP), Rounds Per Minute (RPM), torque, motor load, slope data, road resistance, wind resistance, speed data, differential and double differential of discharge current with respect to time, associated with the vehicle.

7. The method as claimed in claim 1, wherein the plurality of power parameters is one of power, current and torque, associated with the vehicle.

8. A control system for controlling a discharge ratio of a primary battery and a secondary battery in a vehicle,
a processor; and
a memory communicatively coupled to the processor, wherein the memory stores processor-executable instructions, which, on execution, cause the processor to:
retrieve one or more sensor parameters of the vehicle;
estimate a power parameter required by the vehicle based on the one or more sensor parameters; and
identify the discharge ratio corresponding to the power parameter, between the primary battery and the secondary battery, based on a function of power parameter, wherein the function of power parameter is associated with input of a plurality of power parameters of to the vehicle and output of the corresponding discharge ratio, to control the discharge ratio between the primary battery and the secondary battery in the vehicle,
wherein the function of power parameter is generated based on at least one of a drive cycle of the vehicle and historic data associated with the plurality of power parameters of the vehicle, and
wherein generating the function of power parameter based on at least one of the drive cycle and the historic data, comprises:
generating a plot comprising values of the plurality of power parameters of the vehicle for a predefined duration of time, using one of the drive cycle and the historic data;

dividing the plot into predefined number of bands based on the values of the plurality of power parameters of the vehicle, wherein the predefined number of bands comprises first set of bands associated with the one or more first power parameters and second set of bands associated with one or more second power parameters from the plurality of power parameters of the vehicle, said first set of bands is selected based on battery capacity of the secondary battery and the power parameter associated with each of the predefined number of bands;

determining an optimal value of current to be discharged by the primary battery for the second set of bands, based on optimization in the control system;

computing current to be discharged by the secondary battery, for each of the second set of bands, based on total charge associated with respective band from the second set of bands and the optimal value of the primary battery current associated with corresponding band from the second set of bands; and determining the discharge ratio associated with each of the plurality of power parameters of the vehicle based on the computed current of the secondary battery and a maximum current of the primary battery, to generate the function of power parameter.

9. The control system as claimed in claim 8, wherein the function of power parameter comprises one or more first power parameters from the plurality of power parameters of the vehicle, wherein current to be discharged from the secondary battery is zero for said one or more first power parameters.

10. The control system as claimed in claim 8, wherein sum of the second power parameter associated with the second set of bands is one of greater than and equal to the battery capacity of the secondary battery.

11. The control system as claimed in claim 8, wherein each of the predefined number of bands correspond to one of a single value and range of values associated with the plurality of power parameters of the vehicle.

12. The control system as claimed in claim 8, wherein the determining the optimal value of current to be discharged by the primary battery comprises retrieving, by the control system, an error function comprising maximum current associated with each of adjacent bands from the second set of bands, the optimal value associated with the primary battery and an error value calculated by the error function;

varying, by the control system, the optimal value associated with the primary battery until the error value is reduced to a minimal error value;

selecting, by the control system, a varied optimal value associated with the minimal error value as the optimal value of the current to be discharged by the primary battery for the second set of bands.

13. The control system as claimed in claim 8, wherein the one or more sensor parameters comprises at least one of Accelerator Pedal Position (APP), Rounds Per Minute (RPM), torque, motor load, slope data, road resistance, wind resistance, speed data, differential and double differential of discharge current with respect to time, associated with the vehicle.

14. The control system as claimed in claim 8, wherein the plurality of power parameters is one of power, current and torque, associated with the vehicle.

* * * * *